US010402856B2

(12) United States Patent
Dhawan et al.

(10) Patent No.: US 10,402,856 B2
(45) Date of Patent: Sep. 3, 2019

(54) INTERACTION-BASED CONTENT CONFIGURATION

(71) Applicant: Adobe Inc., San Jose, CA (US)

(72) Inventors: Anmol Dhawan, Ghaziabad (IN); Stephane D. Moreau, L'Hay les Roses (FR); Sachin Soni, New Delhi (IN); Ashish Duggal, New Delhi (IN)

(73) Assignee: Adobe Inc., San Jose, CA (US)

( * ) Notice: Subject to any disclaimer, the term of this patent is extended or adjusted under 35 U.S.C. 154(b) by 277 days.

(21) Appl. No.: 14/694,807

(22) Filed: Apr. 23, 2015

(65) Prior Publication Data

US 2016/0314494 A1    Oct. 27, 2016

(51) Int. Cl.
  *G06Q 30/00* (2012.01)
  *G06Q 30/02* (2012.01)
  *G06Q 30/06* (2012.01)

(52) U.S. Cl.
  CPC ..... *G06Q 30/0255* (2013.01); *G06Q 30/0633* (2013.01)

(58) Field of Classification Search
  CPC .................................................. G06Q 30/0255
  See application file for complete search history.

(56) References Cited

U.S. PATENT DOCUMENTS

| 7,636,677 | B1 * | 12/2009 | McGonigal | ....... G06F 17/30867 |
| | | | | 705/26.7 |
| 7,809,608 | B2 * | 10/2010 | Kassan | .............. G06Q 20/4012 |
| | | | | 705/12 |
| 8,433,621 | B2 * | 4/2013 | Linden | ................... G06Q 30/02 |
| | | | | 705/26.7 |
| 8,788,368 | B2 * | 7/2014 | Kreiner | ................... G06Q 30/06 |
| | | | | 705/26.1 |
| 9,247,314 | B1 * | 1/2016 | Parambath | ........... H04N 21/812 |
| 2004/0220884 | A1 * | 11/2004 | Khan | ................... G06Q 30/08 |
| | | | | 705/80 |
| 2005/0278231 | A1 * | 12/2005 | Teeter | ................. G06Q 10/107 |
| | | | | 705/14.51 |

(Continued)

OTHER PUBLICATIONS

Kaufman et al., ("An Eye Tracking Computer User Interface", Proceedings of the 1993 IEEE Research Properties in Virtual Reality Symposium, San Jose, CA, 1993, pp. 120-121.*

*Primary Examiner* — Bennett M Sigmond
*Assistant Examiner* — Scott C Anderson
(74) *Attorney, Agent, or Firm* — SBMC (57) ABSTRACT

Interaction-based content configuration is described. In one or more implementations, interactions of an online store customer with an online store are tracked. When a shopping session is ended and an item viewed during the shopping session is not purchased, personalized marketing content is generated for the customer. To do so, the tracked interactions are analyzed to ascertain which content corresponding to the unpurchased item the customer focused on during the shopping session. The tracked interactions track a gaze of the customer relative to displayed content of the online store, for instance. Further, the content the customer focused on is determined as that which held the customer's gaze for a period of time or which the customer gazed at a greater number of times than other content. The personalized marketing content is configured to include a portion of the focused-on content.

20 Claims, 6 Drawing Sheets

(56) References Cited

U.S. PATENT DOCUMENTS

| | | | | |
|---|---|---|---|---|
| 2007/0022385 | A1* | 1/2007 | Denissov | G06F 17/30884 |
| | | | | 715/745 |
| 2009/0164557 | A1* | 6/2009 | Marlow | G06Q 30/02 |
| | | | | 709/203 |
| 2010/0005488 | A1* | 1/2010 | Rakib | G06F 17/30799 |
| | | | | 725/34 |
| 2012/0117593 | A1* | 5/2012 | Pan | H04N 21/41407 |
| | | | | 725/34 |
| 2012/0284081 | A1* | 11/2012 | Cheng | G06Q 30/02 |
| | | | | 705/7.29 |
| 2012/0323682 | A1* | 12/2012 | Shanbhag | G06Q 30/0641 |
| | | | | 705/14.51 |
| 2012/0330939 | A1* | 12/2012 | McCloskey | G06F 17/30867 |
| | | | | 707/723 |
| 2013/0097011 | A1* | 4/2013 | Wang | G06Q 30/02 |
| | | | | 705/14.45 |

\* cited by examiner

INTERACTION-BASED CONTENT CONFIGURATION

BACKGROUND

When shopping online (e.g., at e-commerce web sites such as Amazon®), customers often add items to an online shopping cart and then terminate their shopping session without purchasing those items. By terminating a shopping session without purchasing items held in an online shopping cart, a customer has abandoned the online shopping cart. It is estimated that a significant number of consumers abandon shopping carts after conducting an online shopping session. Further, the items left in these abandoned shopping carts represent large revenues for businesses with online stores, if the items are purchased.

Consequently, online stores target marketing content to customers with abandoned online shopping carts to convince them to return and purchase items left in the abandoned carts. However, merely sending a reminder email that states, "You have unpurchased products in your cart", can lead to brand irritation and potentially lost customers. Accordingly, conventional techniques for marketing to online store customers fail to convince many to return and purchase items abandoned during shopping sessions.

SUMMARY

Interaction-based content configuration is described. In one or more implementations, interactions of an online store customer with an online store are tracked to ascertain content on which the customer focused during a shopping session. When the shopping session is ended and an item that was viewed during the shopping session is not purchased, personalized marketing content is generated for the customer. To do so, the tracked interactions are analyzed to ascertain which content corresponding to the unpurchased item the customer focused on during the shopping session. The tracked interactions track a gaze of the customer relative to a user interface of the online store, for instance. Further, the content that the customer focused on is determined as that which held the customer's gaze for a given period of time or which the customer gazed at a greater number of times than other content. Regardless of how the focused-on content is ascertained, personalized marketing content is configured so that it includes a portion of the focused-on content.

In addition, the personalized marketing content is configurable to include content related to the focused-on content. For example, content that the online store customer focused on during the shopping session may relate to characteristics of the unpurchased product. Thus, the personalized marketing content is configured to include more information about those characteristics or to include information about substitute items having comparable characteristics. Thus, marketing content that relates to the sale of goods or services an online store customer viewed during a shopping session is personalized based on the interactions of the customer with the online store during the shopping session.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

It is estimated that a significant number of consumers abandon online shopping carts after shopping at online stores. The items left in these abandoned shopping carts represent large revenues for the businesses that operate the online stores. Consequently, businesses strive to increase a rate at which consumers return to the online stores to purchase items left in abandoned online shopping carts. Convincing consumers to return to purchase items left in an online shopping cart may be challenging, however. It may be challenging because doing so may depend on convincing a consumer of the value of characteristics that cause the consumer to consider purchasing an item. Businesses may be limited in the ways they target marketing content (e.g., banner advertisements, promotional emails, search results, recommendations, and so on) to consumers, in part, because conventional targeted-marketing techniques fail to identify content that an individual consumer considers germane to determining whether to purchase a particular item from an online store.

Interaction-based content configuration is described. In one or more implementations, content that a customer interacts with during a shopping session is included in targeted marketing delivered to the customer. During a shopping session at an online store, a customer interacts with content associated with an item (e.g., good or service) available from the online store for sale. For example, a customer views images of the item, reads text describing the item or characteristics of the item, selects certain highlighted characteristics of the item to gather more information about those characteristics, views videos about the item, and so on. In other words, the customer performs some explicit interactions relative to portions of the item content.

Some interactions that customers perform relative to an item of content are more subtle that simply clicking on an image or selecting to play a video, however. For example, when viewing a web page associated with the sale of an item, a customer may simply scroll down the web page and view its content. While the customer is viewing the web page, however, the customer may look at certain portions of content for an extended period of time (e.g., at a particular image of the item or a particular portion of an image), may look at some portions of content repeatedly (e.g., view a picture multiple times or reread a portion of text multiple times), may cause a cursor to hover over some portions of content, and so on. Regardless of whether a customer's interactions with the item content are explicit or subtle, the customer "focuses on" some portions of the web page's content more than others. The content focused on during the shopping session is indicative of the content and characteristics of the item that the customer considers when making a determination about whether to purchase the item.

For any of a variety of reasons, however, customers often leave online stores without purchasing the items considered during an online shopping session. Customers even go so far as to place considered items in an online shopping cart but then leave the online store without purchasing those items, e.g., abandoning the items placed in the online shopping cart. Nevertheless, a customer that adds an item to an online shopping cart demonstrates at least some interest in purchasing the item. Given this, marketers direct targeted marketing to a customer that leaves an item in an online shopping cart to convince the customer to purchase the abandoned item.

Unlike conventional techniques for configuring targeted marketing, the techniques described herein configure targeted marketing content to include content that a customer focused on while shopping for an item. To do so, interactions of a customer with an online store are tracked during a shopping session. The interactions are tracked to ascertain content of the online store on which the customer focuses during the online shopping session. When it is determined that the online store customer has ended the shopping session with one or more unpurchased items in an online shopping cart, personalized marketing content is configured for the online store customer. In particular, the personalized marketing content is configured for communication to the online store customer over a network connection and to include a portion of the content that the online store customer focused on during the shopping session. The portion of content that is included in the personalized targeted marketing content corresponds to at least one of the unpurchased items in the online shopping cart.

By way of example, the interaction-based content configuration techniques may configure targeted marketing content (e.g., a promotional email) to include a portion of an image that the customer viewed for at least a threshold amount of time or repeatedly while shopping for the unpurchased item. The techniques described herein also enable the targeted marketing content to include textual information that expands on focused-on text that the customer read (or reread) while shopping for the item. Accordingly, content that is related to the focused-on content can also be included in the personalized marketing content.

By including portions of content the customer focused on while shopping, the customer will likely recognize the content when it is viewed in the targeted marketing. Moreover, the focused-on content is likely that which the customer considers germane to making the decision about whether to purchase the item. With regard to an item abandoned in an online shopping cart, delivering targeted marketing with content the customer focused on during a shopping session reminds the customer of the characteristics that caused the customer to consider purchasing the item. By using the techniques described herein therefore businesses are able to convince a greater number of customers to return to purchase items in abandoned online shopping carts than businesses using conventional techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
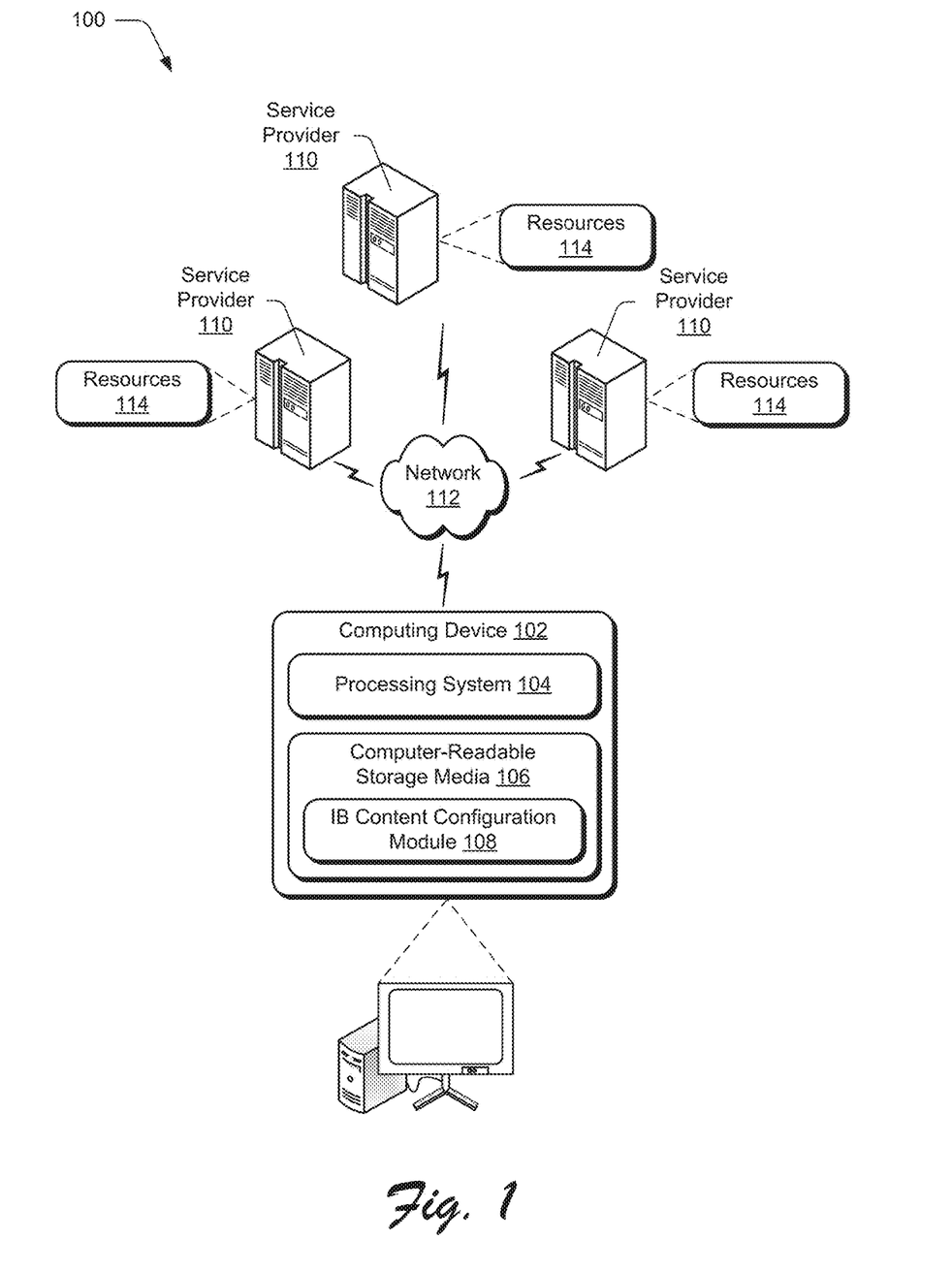
FIG. 1 is an illustration of a digital marketing environment in an example implementation that is operable to employ techniques described herein.

FIG. 1 is an illustration of an environment 100 in an example implementation that is operable to employ techniques described herein. The illustrated environment 100 includes a computing device 102 having a processing system 104 that includes one or more processing devices (e.g., processors), one or more computer-readable storage media 106, and an interaction-based content configuration module 108 ("IB content configuration module 108") embodied on the computer-readable storage media 106 and operable via the processing system 104 to implement corresponding functionality described herein. In at least some implementations, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

As used herein, the term "digital environment" refers to the computing devices, the connections among the computing devices, and the interfaces that make resources provided by service providers available to users. Through the digital environment "online stores" are made accessible to users. As described below, an "online store" refers to a user interface, displayed via a computing device of a user, that enables the user to purchase goods and/or services from a service provider. An "online shopping session" refers to a period of time during which a user views and navigates through the interface associated with the online store to look at and initiate purchases of the goods and services available from the online store.

Other terms used to describe the techniques discussed herein include "marketing content", "NLP", and "OCR". The term "marketing content" refers to content that is communicable to a user for their consumption for the purpose of convincing the user to perform some action (usually purchase) in connection with the sale of goods or services. Marketing content can be configured as images, text, videos, audio content, and so on. Examples of marketing content include emails delivered to an email address of a customer, banner advertisements delivered as part of a website viewed by the customer, and so on.

The term "NLP" refers to natural language processing, which is a technique that is capable of identifying keywords included in a selection of text. As part of doing so, NLP techniques calculate the frequency of keywords included in a selection of text. NLP can also be optimized according to user input to process text in particular ways. By way of example, NLP can be used to classify words in a textual selection into their parts of speech and to label them accordingly. The term "OCR" refers to optical character recognition, which is a technique involving the mechanical or electronic conversion of images of typewritten text into machine-encoded text. Thus, OCR techniques can be performed on text included in images to result in machine-encoded text, which can then be analyzed using NLP techniques.

Returning to the discussion of the environment 100, which is an example digital environment, it further depicts one or more service providers 110, configured to communicate with computing device 102 over a network 112, such as the Internet, to provide a "cloud-based" computing environment. Generally speaking, service providers 110 are configured to make various resources 114 available over the network 112 to clients. In some scenarios, users sign up for accounts that are employed to access corresponding resources from a provider. The provider authenticates credentials of a user (e.g., username and password) before granting access to an account and corresponding resources 114. Other resources 114 are made freely available, (e.g., without authentication or account-based access). The resources 114 can include any suitable combination of services and/or content typically made available over a network by one or more providers. By way of example and not limitation, such services include, but are not limited to, online stores (e.g., Amazon®, Best Buy®, Walmart®, Costco®, and so on) via which a customer selects items such as goods or services for potential purchase and for which an online shopping cart is used to maintain the user-selected goods.

These online stores serve as significant sources of revenue for a variety of businesses and are a means by which many consumers acquire goods and services. Such online stores range from small online stores, having websites that sell just one or a few goods or services through third-party cart and merchant-service technologies, to large online retailers, such as Amazon® where products from an ever-growing number of other online retailers are purchased. The online shopping carts of at least some of these online stores are capable of persisting over multiple shopping sessions for customers that have accounts with those services, or through the use of other technologies, such as cookies. A "cookie" refers to a piece of data that is sent from a website and is stored in a web browser while a user browses the website. When the user subsequently loads the website, the browser sends the cookie back to the corresponding server to notify the website of the user's previous activity, e.g., to notify the website of the items that were in an online shopping cart during a previous shopping session.

The IB content configuration module 108 represents functionality to implement interaction-based content configuration techniques as described herein. For example, the IB content configuration module 108 is configured in various ways configure marketing content to a customer to include content the customer focused on while shopping at the online store. To do so, the IB content configuration module 108 analyzes tracked interactions of a customer with the online store to determine the content the customer focused on while shopping at the online store.

By way of example, an eye tracker tracks the gaze of a customer as the customer views a web page associated with the sale of a particular item. The IB content configuration module 108 analyzes the tracked data indicative of the customer's gaze to determine where on the web page the customer was looking during the shopping session, how long the customer's gaze remained on a certain portion of the web page, and how often the customer's gaze returned to certain portions of the web page (or not). Using such data, the IB content configuration module 108 is configured to ascertain the content on which the customer focused, e.g., if a customer gazed at a portion of an image or a portion of text for at least a pre-determined amount of time or a number of different times, the customer is determined to have "focused on" the item.

Once the IB content configuration module 108 ascertains the content the customer focused on during a shopping session, the IB content configuration module 108 configures marketing content to include at least some of the focused-on content. For example, the IB content configuration module 108 configures targeted marketing content in the form of an email to convince a customer to purchase an item abandoned in an online shopping cart. The IB content configuration module 108 configures the email to include a portion of an image that the customer focused on while shopping for the abandoned item. The IB content configuration module 108 also configures the email to include content related to the focused-on content, e.g., further information about characteristics shown or described in the focused-on content, items having comparable characteristics to those shown or described in the focused-on content, and so on. Broadly speaking, the IB content configuration module 108 configures targeted marketing content to inform customers about characteristics they demonstrate are to be considered when determining whether to purchase a given item.

In one or more implementations, the IB content configuration module 108 is implementable as a software module, a hardware device, or using a combination of software, hardware, firmware, fixed logic circuitry, etc. Further, the IB content configuration module 108 is implementable as a standalone component of the computing device 102 as illustrated. In addition or alternatively, the IB content configuration module 108 is configured as a component of a web service, an application, an operating system of the computing device 102, a plug-in module, or other device application as further described in relation to FIG. 6.

Having considered an example environment, consider now a discussion of some example details of the techniques for interaction-based content configuration in accordance with one or more implementations.

Interaction-Based Content Configuration Details

Figure 2:
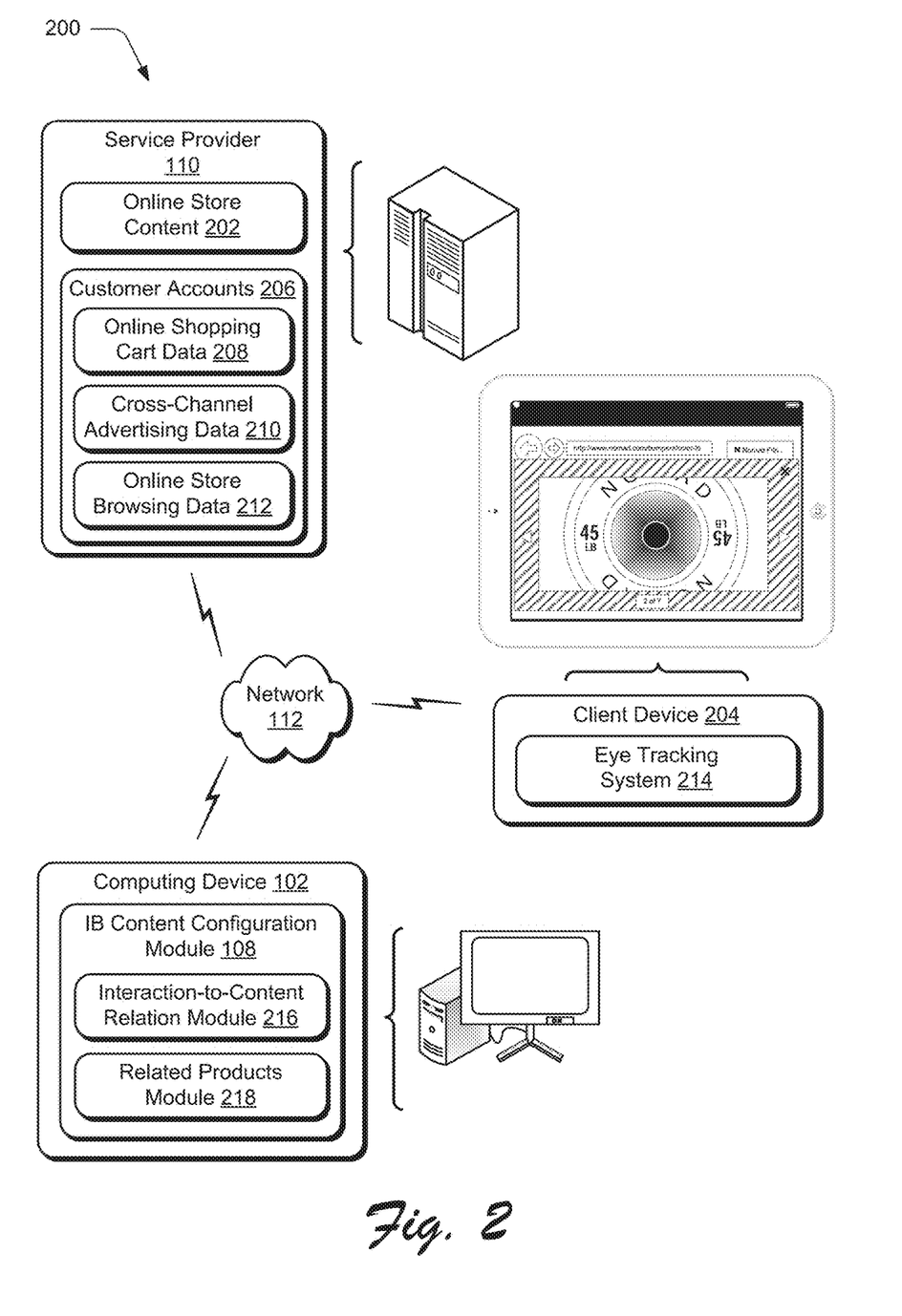
FIG. 2 illustrates from the environment from FIG. 1 a service provider and a computing device having an interaction-based content configuration module in greater detail.

This section describes some example details of interaction-based content configuration techniques in accordance with one or more implementations. FIG. 2 depicts generally at 200 some portions of the environment 100 of FIG. 1, but in greater detail. In particular, the computer-readable storage media 106, the service provider 110, and the components included therein are depicted in greater detail.

In general, the service provider 110 depicted in FIG. 2 serves as a source through which items such as goods and services are purchased. By way of example, the service provider 110 corresponds to an online store that is implemented in the form of a website having multiple web pages. The web pages of the online store are implemented using a variety of content, including hypertext markup language (HTML), text, images, videos, advertising content, script, and so forth. This content for configuring the web pages of the online store is represented by online store content 202.

The online store content 202 is communicable over the network 112 to client device 204, which like the computing device 102, is configurable as any suitable type of computing device, e.g., a desktop computer, a laptop computer, a mobile device, a tablet, and so forth. At the client device 204, the online store content 202 is displayed by a display device of the client device 204 via a user interface. The customer interacts with the online store content 202 displayed via the user interface to conduct shopping sessions at the online store and to interact with the online store in other ways, e.g., to update credit card information, set up or manage a customer account, and so forth.

Service provider 110 is depicted with customer accounts 206. The customer accounts 206 represent data associated with customers that have signed up for accounts with the online store. A customer may be able to take advantage of a variety of conveniences and benefits by signing up for an account with an online store. For example, a customer that signs up for an account with an online store may enter data (e.g., credit card number, shipping address, billing address, and so on) once and then have the data saved for future purchases. By doing so, the customer is able to quickly checkout from the online store, e.g., by simply confirming a credit card number, shipping address, and billing address rather than re-entering that data each time the customer checks out. Additionally, signing up for an account enables the customer to receive advertising content for deals offered by the online store. For example, the customer may receive emails enabling the customer to take advantage of discounted pricing that is not available to customers without customer accounts.

Having a customer account also enables a customer to add items from the online store to a shopping cart during a shopping session, end that shopping session, come back for a later shopping session, and have the same items in the cart at the later shopping session. Online shopping carts having this sort of functionality are referred to as "persistent" online shopping carts. To the extent that online shopping carts persist over multiple shopping sessions, these shopping carts are also capable of being "abandoned" by a customer, e.g., when a customer navigates to a different website or closes a web browser but leaves items in the online shopping cart.

Returning to the discussion of conveniences and benefits associated with the customer accounts 206, having a customer account with the service provider 110 enables data for a customer to be tracked. In FIG. 2, the customer accounts 206 are illustrated with online shopping cart data 208, cross-channel advertising data 210, and online store browsing data 212. Accordingly, the service provider 110 causes at least the online shopping cart data 208, the cross-channel advertising data 210, and the online store browsing data 212 for a customer to be tracked. For instance, this data is maintained (e.g., in databases) along with other data (e.g., credit card information, addresses, and so on) of the customer accounts 206. Such other data may also include a designation for a customer as a business-to-business (B2B) customer or a business-to-consumer (B2C) customer.

In any case, the online shopping cart data 208 represents a variety of data associated with items added to, removed from, and purchased from an online shopping cart. For example, the online shopping cart data 208 describes attributes of items in persistent shopping carts that have been abandoned in an earlier shopping session, such as a median age of items that are purchased from an online shopping cart, a median age of unpurchased items in an online shopping cart, a number of cart interactions a customer has per shopping session, and so forth. The online shopping cart data 208 also describes attributes such as a size of the online shopping cart (in terms of quantity of items and total price of the items in the online shopping cart), an average price of the items in the online shopping cart, and so forth. The online shopping cart data 208 may describe other attributes related to online shopping carts and the items therein, removed therefrom, or purchased therefrom, without departing from the spirit or scope of the techniques described herein.

The cross-channel advertising data 210 represents a variety of data that describes interactions of customers with content outside of an online store's website. By way of example, the cross-channel advertising data 210 may describe interactions of a customer with an email associated with the online store (e.g., whether the customer viewed the email, simply deleted the email, selected portions of the email, and so on), interactions of the customer with a video advertisement delivered via a video game system, interaction of the customer with promotional games, interactions of the customer to click on banner advertisements displayed as part of websites other than the online store, and so on. When a customer opens and read an email from an online store, it can indicate that the customer is still interested in returning to the online store to make a purchase, even if the customer has not returned to browse the online store. Such actions may indicate that the customer is collecting more information about items before returning to the abandoned cart to make a purchase. It should be appreciated that the cross-channel advertising data 210 may describe still other cross-channel based interactions than those enumerated above without departing from the spirit and scope of the techniques described herein.

The online store browsing data 212 represents a variety of data associated with how customers interact with the online store. For example, the online store browsing data 212 includes clickstream data. The clickstream data indicates where in a website a user "clicks", e.g., images, videos, menu items, control buttons (e.g., media player control buttons), dropdowns, hyperlinks, scrolling selections, and so on. With regard to a web page associated with a particular item, the clickstream data is used to determine the item images (or portions thereof) that a user zooms in on or zooms out to, or with which the user otherwise interacts. With regard to interactions involving video content, clickstream data is used to determine a time of the video at which a user selects a pause button, selects to rewind the video (and the time in the video that the user rewinds to), portions of the video that the user watches before stopping playback, and so on.

As used herein, the term clickstream data also indicates a location of a user's cursor relative to objects displayed on a web page. In other words, the clickstream data indicates where a cursor hovers on a web page, e.g., whether the cursor hovers on different images, portions of text, videos, and so forth. Thus, clickstream data can be used to ascertain content over which a customer causes a cursor to hover, a number of times a customer causes the cursor to hover over certain content, an amount of time the customer causes the cursor to hover over particular content, and so on.

In addition to clickstream data, the online store browsing data 212 includes data that describes where the gaze of a user is focused relative to a user interface. The data that describes where the gaze of the user is focused is generated by an eye tracking system 214 of the client device 204. The eye tracking system 214 is configured to measure at least one of the point of gaze (e.g., where on the user interface the user is looking) and motion of a user's eyes relative to the user's head. The eye tracking system 214 is used with the techniques described herein to ascertain the online store content 202 that a customer has focused on.

The data generated by the eye tracking system 214 indicates not only which portions of the user interface a customer views, but also indicates an amount of time the customer spends viewing those portions and how often the customer's gaze returns to the various portions. To this extent, the online store browsing data 212 that results from tracking the customer's gaze can be analyzed to ascertain which portions of content associated with an item for sale the customer views, how long the customer views portions of content associated with an item, and how often the customer's gaze returns to view the portions of content associated with an item. Based on this data, the focused-on content can be ascertained, e.g., by determining which content a customer gazes at longer than a threshold amount of time, a longer time than other content associated with an item, more than a threshold number of times, more times than other content, and so forth. In any case, the eye tracking data generated using the eye tracking system 214 is communicable from the client device 204 to the service provider 110 for storage as part of the online store browsing data 212. It is also communicable to the computing device 102 for analysis by the IB content configuration module 108 and the components thereof.

In addition, the online store browsing data 212 includes data that describes a customer's browsing activities performed outside of the online store (e.g., relative to other online stores) and browsing activities performed while shopping for multiple different items at the online store, e.g., browsing actions that take a user to web pages of comparable products. By way of example, the online store browsing data 212 describes other websites visited by the customer, searches performed by the customer via a search engine, and so on. The online store browsing data 212 may also represent other data indicative of a customer's shopping-related interactions without departing from the techniques described herein.

To process the online store browsing data 212 in accordance with the techniques described herein, the IB content configuration module 108 includes an interaction-to-content relation module 216 ("I2C relation module 216") and a related products module 218 as illustrated in FIG. 2. These modules represent functionality of the IB content configuration module 108 and it should be appreciated that such functionality is implementable using more or fewer modules than those illustrated. The computing device 102 is configured to access the online store browsing data 212 over the network 112 to implement the techniques described herein. The discussion of the I2C relation module 216 and the related products module 218 refers to FIGS. 3 and 4, which illustrate example content pertinent to the operation of those modules.

In general, the IB content configuration module 108 represents functionality to personalize marketing content for an online store customer to convince the customer to purchase at least one item the customer viewed while shopping at the online store. In particular, the IB content configuration module 108 represents functionality to personalize the marketing content based on the customer's interactions that took place during a shopping session at the online store. For example, the IB content configuration module 108 personalizes marketing content based on the online store browsing data 212 tracked and collected in association with the shopping session, e.g., the clickstream data and eye tracking data.

Figure 3:
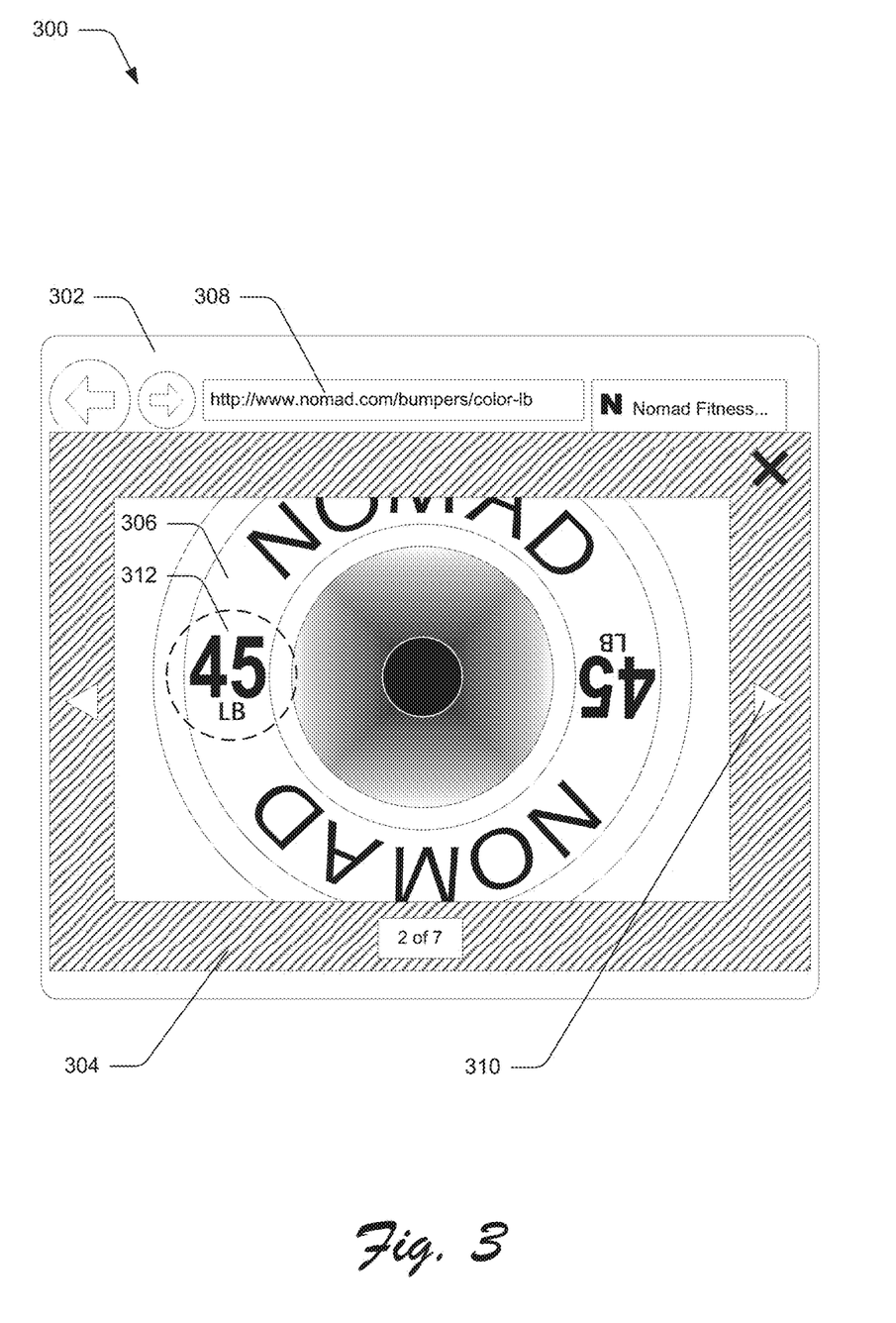
FIG. 3 is an example implementation depicting a user interface that is displayable to an online store customer and with which the online store customer interacts during a shopping session to enable personalized marketing content to be generated.

FIG. 3 depicts a user interface that is displayable to an online store customer and with which the customer interacts during a shopping session to enable personalized marketing content to be generated. In particular, FIG. 3 depicts at 300 a user interface of an online store (e.g., Nomad Fitness) configured as web browser 302. The web browser 302 displays a view 304 of item 306. Display of the view 304 may have been initiated by a user selection from a web page (not shown) corresponding to the item 306. In particular, the customer may have selected to zoom in on an image corresponding to the view 304 from the web page of the item 306. Thus, the view 304 enables the user to look closer at the image included in the web page of the item 306. In any case, the selection of the image that results in display of the view 304 is an interaction that is tracked, and data indicative of the interaction is maintained as part of the online store browsing data 212.

When the view 304 is displayed, the eye tracking system 214 tracks where the gaze of the customer is focused relative to the web browser 302 (e.g., if the customer gazes at address bar 308), the view 304 (e.g., if the customer gazes at the 'next image' button 310), the item 306 (e.g., if the customer gazes at the '45 LB' artwork 312 of the item 306), and so on. In a similar manner, the eye tracking system 214 tracks where the gaze of the customer is focused when the web page of the item 306 is displayed via the web browser 302. Clickstream data indicative of the customer's interactions with both the web page of the item 306 and the view 304 of the item 306 is also tracked.

Although the user interface of FIG. 3 is depicted within the web browser 302, the user interface with which a customer interacts to shop at the online store may be configured in a variety of other ways without departing from the spirit or scope of the techniques described herein. By way of example and not limitation the user interface may be configured as a mobile application interface.

Figure 4:
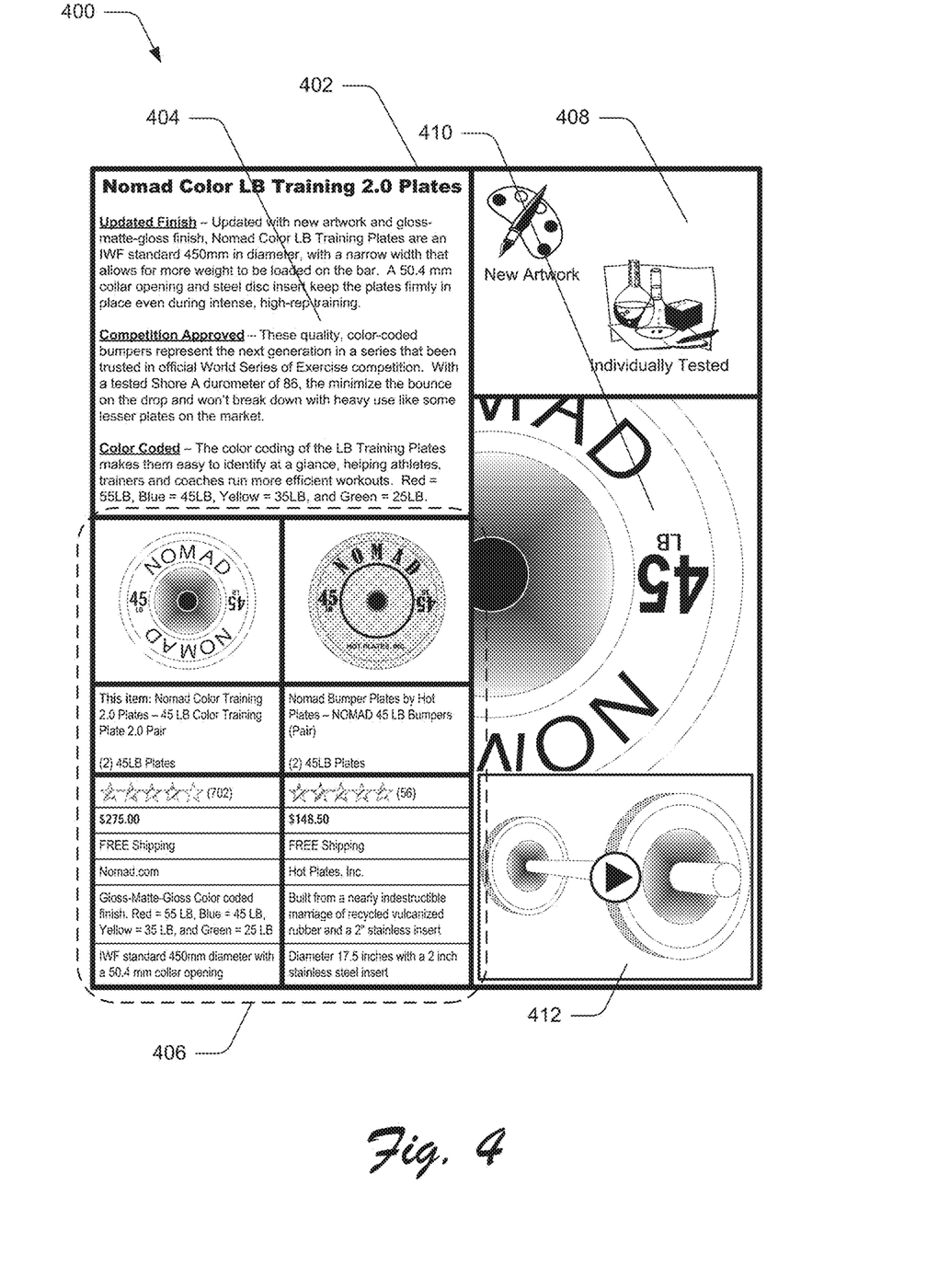
FIG. 4 is an example implementation depicting marketing content that is personalized according to interaction-based content configuration techniques.

FIG. 4 depicts an example of marketing content that is personalized according to interaction-based content techniques. In particular, FIG. 4 depicts at 400 personalized marketing content 402 that is configured to include a textual description section 404, a comparable items section 406, a characteristics section 408, an image-of-interest section 410, and a video-of-interest section 412. The personalized marketing content 402 is configurable in a variety of different ways without departing from the spirit or scope of the techniques described herein. For example, the personalized marketing content 402 can be configured to include more or fewer sections, with different sections, with sections arranged differently, and so on. The personalized marketing content 402 can also be configured as a variety of different types of media content, e.g., as an email or series of emails, as a banner advertisement, as an individually generated web page, as personalized content displayable via an app, and so forth.

As mentioned above, the IB content configuration module 108 is configured to generate personalized marketing content, such as the personalized marketing content 402 of FIG. 4. The IB content configuration module 108 may generate the personalized marketing content 402, for instance, when it is determined that a customer has left the online store but has added and left the item 306 in the online shopping cart. Alternately or in addition, the IB content configuration module 108 may generate the personalized marketing content when it determines that a customer has left the online store but merely viewed the item 306 (e.g., by interacting with a web page associated with the item) during the terminated shopping session.

To generate the personalized marketing content 402, the IB content configuration module 108 employs functionality of the I2C relation module 216 and the related products module 218. Broadly speaking, the I2C relation module 216 relates the interactions performed by a customer to content that can be included in personalized marketing content. With reference to the examples in FIGS. 3 and 4, the I2C relation module 216 relates the interaction of the customer to select an image that causes the view 304 of the item 306 to be displayed to the selected image. Based on this relationship, the IB content configuration module 108 configures the personalized marketing content 402 to include the selected image, or a portion thereof, e.g., in the image-of-interest section 410. The I2C relation module 216 also relates an interaction of the customer to simply focus on the selectable image, by looking at it for a threshold amount of time or number of times, to the image for inclusion in the personalized marketing content 402.

With further reference to the examples in FIGS. 3 and 4, the I2C relation module 216 relates interactions by the user to focus on the '45 LB' artwork 312 (e.g., by gazing at, hovering a cursor over, or the like) to characteristics of the item 306. By way of example, the I2C relation module 216 may ascertain that the '45 LB' artwork 312 relates to characteristics of the item 306 that it has new artwork and is tested to meet weightlifting competition standards. Thus, the IB content configuration module 108 can configure the personalized marketing content to include information or content pertaining to the ascertained characteristics. The illustrated example represents a scenario in which the IB content configuration module 108 configures the personalized marketing content 402 to include information about the new artwork and the competition testing, e.g., in the textual description section 404. In this scenario, the IB content configuration module 108 also configures the personalized marketing content 402 to include other content (e.g., small graphics) representative of the new artwork and the competition testing, e.g., in the characteristics section 408.

The IB content configuration module 108 represents functionality to populate the textual description section 404 with information about characteristics of interest to the particular customer. To do so, the I2C relation module 216 may analyze which portions of textual content were focused on by the customer (e.g., based on the data indicative of the customer's gaze) and determine that the focused-on portions of textual content correspond to characteristics of interest of the item 306. The I2C relation module 216 may also analyze which images or portions thereof were focused on by the customer and determine that the focused-on images correspond to characteristics of interest of the item 306. Once the characteristics of interest of the item are determined, the IB content configuration module 108 populates the characteristics section 408 with content indicative of the determined characteristics of interest.

In the illustrated example, the IB content configuration module 108 also configures the personalized marketing content 402 to include the video-of-interest section 412. The IB content configuration module 108 does so when the customer interacts with a video associated with the item 306, e.g., a video included on the web page of the item 306. The I2C relation module 216 determines the portions of the video with which the customer interacted (e.g., paused, watched multiple times, etc.) and selects an image that relates to the interacted-with portions of the video. The IB content configuration module 108 then configures the personalized marketing content 402 to include the image related to the interacted-with portion of the video, e.g., in the video-of-interest section 412. In one or more implementations, the image related to the interacted-with portion of the video is selectable from the personalized marketing content 402 to launch a corresponding video.

In contrast to the I2C relation module 216, the related products module 218 analyzes the interactions of a customer to ascertain items related to the item for which the personalized marketing content is generated. For example, the related products module 218 may analyze the interactions of the customer and ascertain that the customer interacted with web pages for multiple different, but comparable, items while shopping at the online store. Thus, the related products module 218 may relate these comparable items to the item. Based on the determined relations, the IB content configuration module 108 can include information or content about the related products in personalized targeted marketing.

With reference to the example illustrated in FIGS. 3 and 4, the customer may view an item related to the item 306 while shopping for the item 306, which in the illustrated examples corresponds to the 'Nomad Color Training 2.0 Plates'. While shopping for the Nomad Color Training 2.0 Plates, the customer may have also viewed the 'Bumper Plates by Hot Plates', e.g., a related item as determined by the related products module 218. Based on the determination by the related products module 218 that the Bumper Plates by Hot Plates are related to the item 306, the IB content configuration module 108 configures the personalized marketing content 402 to include information about the related product. In particular, the IB content configuration module 108 configures the comparable items section 406 to include information about the related item, e.g., as a review or comparison to the item.

The related products module 218 also represents functionality to determine related items in ways other than simply identifying the comparable items that a customer viewed during a shopping session. For example, the related products module 218 may determine related items based on characteristics of an item the customer focused on during a shopping session. Continuing with the example in which it is determined the customer is interested in the new artwork and the competition testing of the item 306, the related products module 218 is configured to identify products having characteristics comparable to those characteristics. In this example, the related products module 218 determines that the Nomad Bumper Plates by Hot Plates have characteristics comparable to the characteristics of the item 306. Given this, the IB content configuration module 108 configures the personalized marketing content 402 to include information about the Nomad Bumper Plates by Hot Plates in the comparable items section 406. The related products module 218 may use a customer's interactions with the online store to ascertain items that relate to a particular item (e.g., an item abandoned in a shopping cart and for which the personalized marketing content is delivered) in a variety of other ways without departing from the spirit or scope of the techniques described herein.

In an example implementation, a customer shops at an online store, views a web page about the item 306 and web pages for one or more other items available from the online store, adds the item 306 to a shopping cart of the online store, then leaves the online store without purchasing the item 306. In other words, the customer abandons the item 306 in the online shopping cart. In response to the abandonment, the IB content configuration module 108 analyzes the information tracked for the shopping session to configure personalized marketing content to convince the customer to return to the online store and purchase the item 306.

The IB content configuration module 108 analyzes the tracked information by employing the I2C relation module 216 and the related products module 218 to ascertain from the online store browsing data 212 the different items viewed by the customer during the shopping session. An item is considered to have been "viewed" if the customer spends more than a threshold amount of time on a web page of the item. From the items viewed, the related products module 218 ascertains the products viewed that are also related to the item 306 abandoned in the online shopping cart.

For the items viewed in a particular category (e.g., bumper plates), the IB content configuration module 108 ascertains the textual content on which the customer focused, e.g., on the web pages of those items. The IB content configuration module 108 also ascertains the textual content that the customer did not focus on, e.g., the portions that the customer gazed at for a short amount of time and those on which the customer's gaze did not focus for even a short amount of time. The textual content on which the customer focused (or did not focus) may be part of item descriptions, lists of item characteristics, item reviews, and so on.

Given the determination of the textual content that the customer focused on and the textual content that the customer did not focus on, the IB content configuration module 108 employs natural language processing (NLP) techniques to identify characteristics that the customer uses to compare products in a particular category. The IB content configuration module 108 also employs NLP techniques to identify the characteristics of the item 306, which is abandoned in the online shopping cart, that are of interest to the customer, e.g., because the customer focused on text related to these characteristics.

For the items abandoned in the online shopping cart (e.g., the item 306), the IB content configuration module 108 ascertains the images on the item web pages that the customer gazed at the most, e.g., for the most amount of time or more times than other images. These images are considered the focused-on images. Using the eye tracking system 214, the IB content configuration module 108 also ascertains the portions of the images that the customer focused on, e.g., because the customer gazed at these portions for the longest amount of time or more often than other portions of the image. Further, the IB content configuration module 108 employs optical character recognition (OCR) techniques to recognize text included in the focused-on images or focused-on portions of the images. The IB content configuration module 108 then employs the NLP techniques to identify, from recognized text, characteristics of the item 306 that are of interest to the customer.

As discussed above, the IB content configuration module 108 is also configured to analyze interactions with video to determine which content to include in personalized marketing content. In the continuing implementation example, the IB content configuration module 108 determines from the online store browsing data 212 whether a customer viewed a video associated with the item 306, any portions of the video the customer skipped, and which portions of the video the customer viewed. The IB content configuration module 108 also uses this video interaction data to determine which characteristics of the item 306 are of interest to the customer, e.g., the portions of the video that the customer skipped are determined to correspond to characteristics of the item that are not of interest to the customer while the portions of the video that the customer watched are determined to correspond to characteristics of the item that are of interest to the customer. Moreover, the IB content configuration module 108 is configured to determine videos that relate to the characteristics of interest to the user. Accordingly, the IB content configuration module 108 may include or link to these characteristic-of-interest videos (e.g., by way of a hyperlink or image that is selectable to launch a video) in the personalized marketing content 402.

Based on the analyses of the focused-on textual content, the focused-on image content, and the interacted-with video content, the IB content configuration module 108 personalizes marketing content for the customer. By way of example, the IB content configuration module 108 generates an email to the customer with the personalized marketing content 402. The personalized marketing content 402 in this example is configured to include the comparable items section 406. The comparable items section 406 may include, for instance, a comparison of the item 306 abandoned in the cart to a comparable item that the related products module 218 determines is the nearest competitor. Alternately or in addition, the comparable items section 406 may include a comparison of the item 306 abandoned in the cart to another item that the customer viewed at the online store.

In any case, the comparison is generated to include the characteristics of the item and the substitute item that are of interest to the customer. The characteristics of the item and the substitute item that are included in the comparison are the characteristics for which the customer gazed at associated content or information for a longer period of time or more frequently than other characteristics. In other words, the characteristics compared are associated with the content and the information the customer focused on during the shopping session. In this way, the characteristics that are of interest to the customer can be compared side-by-side for different, but comparable, items. Furthermore, the characteristics added to the comparison first may be those characteristics that the customer focused on more than other characteristics. Other characteristics may be added to the comparison according to an order of which characteristics were focused on more than others. In some scenarios, presenting the characteristics of interest to the customer in this way is effective to convince the customer that the abandoned product is not expensive relative to competing products. The IB content configuration module 108 configures the personalized marketing content 402 to include content that indicates the abandoned item 306 is not expensive or has better characteristics relative to competing items. The manner in which the IB content configuration module 108 does so may depend on a marketing strategy of the online store.

The personalized marketing content 402 in this example is also configured to include the textual description section 404. By way of example, the textual description section 404 is configurable to include additional descriptions of the item 306 that are beyond the descriptions included as part of the web page for the item 306. The additional descriptions added to the textual description section add more detail about the characteristics of the item that are determined to be of interest to the customer. When configuring the textual description with the additional descriptions, the descriptions added first relate to the characteristics of the item that are of most interest to the customer, e.g., the characteristics of the item for which the customer spent the most time gazing at associated content or information. After detailed descriptions of the characteristics of interest are added and if there is still more space in the textual description section 404, additional descriptions about other characteristics may be added e.g., descriptions about characteristics that the customer focused on less than the characteristics of interest. In this way, additional descriptions about characteristics may be added to the personalized marketing content according to an order of which characteristics were focused on more than others.

In addition, the textual description section 404 is configurable to include positive reviews of the item 306 beyond those the customer viewed when shopping at the online store. The positive reviews correspond to reviews in which the customer's characteristics of interest for the item 306 are discussed positively by reviewers of the item 306. When configuring the textual description to include the positive reviews, the reviews added first relate to the characteristics of the item that are of most interest to the customer, e.g., the characteristics of the item for which the customer spent the most time gazing at associated content or information. After reviews in which reviewers positively discuss the customer's characteristics of interest are added and if there is still more space in the personalized marketing content 402, additional reviews may be added that discuss aspects of the items 306 other than the characteristics of interest, e.g., characteristics that the customer focused on less than the characteristics of interest. In this way, reviews that discuss characteristics of the item may be added to the personalized marketing content 402 according to an order of which characteristics were focused on more than others. Generally though, the additional descriptions and reviews included in the textual description section 404 relate to the characteristics the customer focused on when shopping at the online store.

In some implementations, the IB content configuration module 108 omits additional descriptions and reviews that relate to characteristics the customer did not focus on because it is assumed the customer does not care about those characteristics. In other implementations, however, the IB content configuration module 108 may include additional descriptions and reviews that relate to characteristics the customer did not focus on because it may be that the customer simply missed the content related to those characteristics while shopping at the online store. In any case, the additional descriptions and reviews included in the personalized marketing content assist the customer in performing more research about the item 306 before making a purchase. Furthermore, by omitting the characteristics that the customer is determined not to care about, the personalized marketing content 402 is directed to the characteristics that are of interest to the customer.

The personalized marketing content 402 in this example is also configured to include the image-of-interest section 410. The IB content configuration module 108 may, for instance, populate the image-of-interest section 410 with an image or a portion of an image that the customer focused on while shopping for the item 306. Further, the IB content configuration module 108 populates the video-of-interest section 412 with a video about item characteristics the customer focused on. Alternately, the IB content configuration module 108 populates the video-of-interest section 412 with an image or a hyperlink that is selectable to launch the video about the item characteristics the customer focused on. The images or image portions included in the image-of-interest section 410 and the videos included in the video-of-interest section 412 serve as reminders to the customer of the item characteristics that caused the customer to consider the item for purchase.

In addition, the IB content configuration module 108 is configured to generate an email subject when the personalized marketing content 402 is an email. To do so, the IB content configuration module 108 analyzes the item characteristics the customer focused on and generates the email subject to relate to those characteristics. In particular, the IB content configuration module reorders a description of item characteristics in the email subject based on the characteristics the customer focused on during a shopping session. The re-ordering may be based on the characteristics that the customer is determined to have focused on by spending the most time gazing at information or content associated with those characteristics, by returning the most frequently to the information or content associated with those characteristics and the like. Thus, when the customer sees the email in an email inbox, the customer is reminded of the item characteristics that caused the customer to consider the item for purchase. Further, the reminder of these characteristics is likely to cause the customer to eventually open the email to view the personalized marketing content 402.

In one or more implementations, a marketer specifies a template for personalized marketing content. The template may be specified to include the various parts of the personalized marketing content 402, e.g., the textual description section 404, the comparable items section 406, the characteristics section 408, the image-of-interest section 410, and the video-of-interest section 412. However, a marketer may define a different template with different parts. In any case, the IB content configuration module 108 populates the parts of the template with content based on interactions of a customer with the content of an online store. By including content based on a customer's interactions, the IB content configuration module 108 personalizes the marketing content according to the customer's particular experience with the online store as it relates to shopping for a given item.

Having discussed example details of the techniques for interaction-based content configuration, consider now some example procedures to illustrate additional aspects of the techniques.

Example Procedures

This section describes example procedures for interaction-based content configuration in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the example computing device 102 of FIGS. 1 and 2 that makes use of an IB content configuration module 108.

Figure 5:
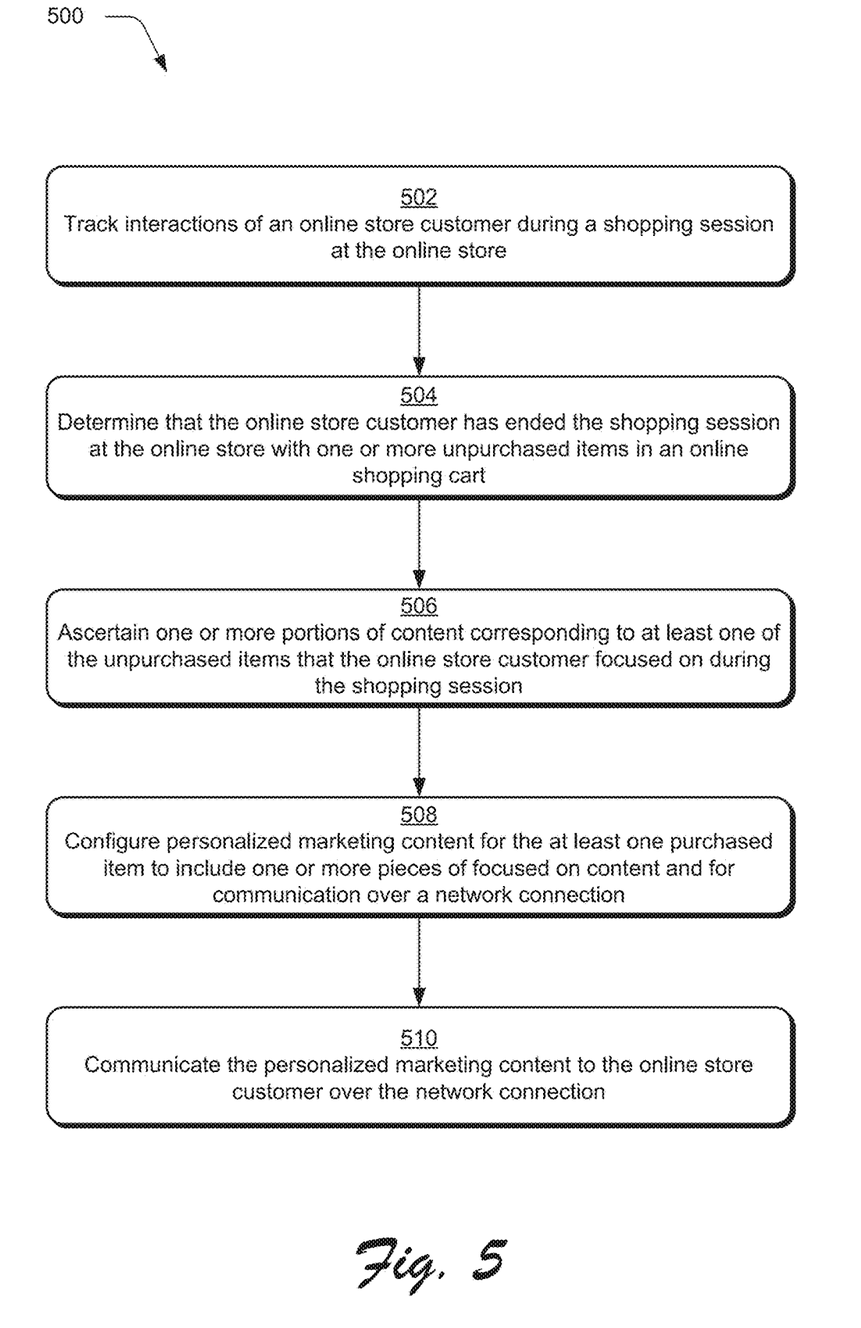
FIG. 5 is a flow diagram depicting a procedure in an example implementation in which marketing content is personalized for an online store customer based on online store content the customer focused on during a shopping session at the online store.

FIG. 5 depicts an example procedure 500 in which marketing content is personalized for an online store customer based on online store content the customer focused on during a shopping session at the online store. The interactions of an online store customer are tracked during a shopping session at an online store (block 502). For example, the eye tracking system 214 tracks the gaze of a customer as it views a user interface that displays the online store content 202, e.g., the web pages associated with items for sale at the online store. Clickstream data of the customer that describes cursor interactions (e.g., performed via control of a mouse) and touch interactions is also tracked. Data indicative of the tracked interactions is storable at the service provider 110 as the online store browsing data 212.

A determination is made that the online store customer has ended the shopping session at the online store with one or more unpurchased items in the online shopping cart (block 504). For example, when the customer closes a web browser being used to view the online store, navigates the web browser to a web page not associated with the online store, or closes an app of the online store, the service provider 110 may also cause a determination to be made about whether the online store customer has unpurchased items in the online shopping cart. This determination may be made by components of the service provider or by components of the computing device 102, e.g., by the IB content configuration module 108. For instance, it is determined that the customer ended a shopping session at the online store and left the item 306 in the online shopping cart.

The tracked data is analyzed to ascertain content corresponding to the unpurchased items on which the online store customer focused during the shopping session (block 506). For example, the IB content configuration module 108 analyzes the online store browsing data 212 to ascertain the content that the online store customer focused on during the shopping session that was determined to have ended at block 504. The IB content configuration module 108 also ascertains which of the focused-on content corresponds to the items abandoned in the online shopping cart. When the customer leaves the item 306 in the online shopping cart, the IB content configuration module 108 ascertains the content corresponding to the item 306 that the customer focused on during the online shopping session, e.g., the customer focused on the '45 LB' artwork 312 of the item 306.

In one or more implementations, personalized marketing content is generated for customers that did not add items to the online shopping cart during a shopping session. When customers do not add any items to the online shopping cart during a shopping session, the IB content configuration module 108 can determine which item or items the customer focused on during the shopping session. For instance, the IB content configuration module 108 may ascertain from the online store browsing data 212 which items available from the online store the customer viewed for the longest amount of time. By viewing information about an item for at least a certain amount of time, a customer demonstrates at least some interest in purchasing the item. In these cases, the IB content configuration module 108 also ascertains which content corresponding to the item the customer focused on during the shopping session.

Personalized marketing content is configured for the unpurchased items to include portions of the content that the online store customer focused on during the shopping session and that corresponds to the unpurchased items (block 508). The personalized marketing content is also configured for communication to the customer over a network connection. For example, the IB content configuration module 108 configures the personalized marketing content 402 to convince the customer to return to the online store to purchase the unpurchased item.

In the example in which the customer focuses on the '45 LB' artwork 312 of the item 306, the IB content configuration module 108 configures the personalized marketing content 402 to include the image (or a portion of the image) showing the '45 LB' artwork 312, e.g., via the image-of-interest section 410. In this example, the '45 LB' artwork 312 of the item 306 also corresponds to characteristics of the item 306, e.g., that its artwork has been updated from a previous version of the item and that it is tested to meet weightlifting competition standards. Accordingly, the IB content configuration module 108 configures the personalized marketing content to include information that expands on the characteristics related to the interacted-with content, e.g., via the textual description section 404 and the characteristics section 408.

In the continuing example, the IB content configuration module 108 configures the personalized marketing content 402 for communication to the customer. To do so, the IB content configuration module 108 configures the personalized marketing content 402 for communication over the network 112, such as by configuring the personalized marketing content 402 as an email message for communication to the client device 204. As part of configuring the personalized marketing content 402 as an email message, the IB content configuration module 108 generates an email subject that includes information about the focused-on characteristics of the unpurchased item.

The personalized marketing content is communicated to the online store customer over the network connection (block 510). For example, the personalized marketing content 402 is emailed over the network 112 to the customer. In one scenario, the customer receives the email with the marketing content at the client device 204. From an email inbox, displayed at the client device 204, the customer selects to open the email, which results in display of the personalized marketing content 402. Through a user interface displayed by the client device 204, the customer may interact with the personalized marketing content 402. The interactions of the customer with the personalized marketing content 402 can also be tracked, e.g., to ascertain a success rate of an associated email campaign. The tracked interactions with the personalized marketing campaign indicate how many customers opened emails to view the personalized marketing content, how many customers that viewed the personalized marketing content returned to the online store to purchase the unpurchased items, and so on.

Having described example procedures in accordance with one or more implementations, consider now an example system and device that can be utilized to implement the various techniques described herein.

Example System and Device

Figure 6:
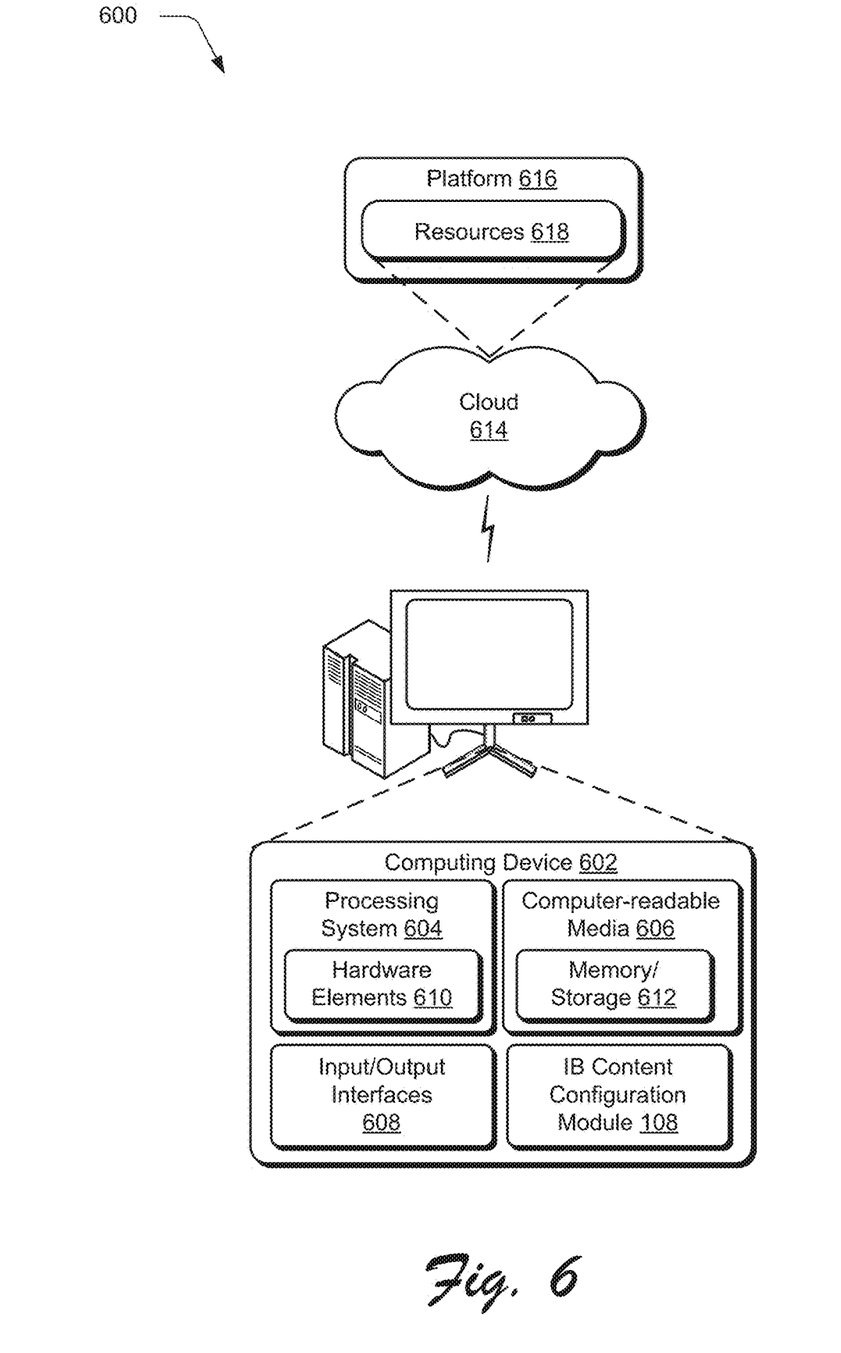
FIG. 6 illustrates an example system including various components of an example device that can be employed for one or more implementations of interaction-based content configuration techniques described herein.

FIG. 6 illustrates an example system generally at 600 that includes an example computing device 602 that is representative of one or more computing systems and/or devices that implement the various techniques described herein. This is illustrated through inclusion of the IB content configuration module 108, which operates as described above. The computing device 602 may be, for example, a server of a service provider, a device associated with a client (e.g., a client device), an on-chip system, and/or any other suitable computing device or computing system.

The example computing device 602 includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This includes implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 602, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software are achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 abstracts resources and functions to connect the computing device 602 with other computing devices. The platform 616 also serves to abstract scaling of resources to provide a corresponding level of scale to encountered demand for the resources 618 that are implemented via the platform 616. Accordingly, in an interconnected device implementation, implementation of functionality described herein is distributed throughout the system 600. For example, the functionality is implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital environment in which client device users select items such as products or services for potential purchase via an online store and an online shopping cart is used to maintain the user-selected items, a method of personalizing marketing content for client device users by at least one computing device, the method comprising:

tracking, by the at least one computing device, a gaze of a client device user relative to a display device displaying online store content during a shopping session at the online store;

generating, by the at least one computing device, tracking data describing locations on the display device where the online store content is displayed that correspond to the client device user's tracked gaze;

determining, by the at least one computing device, that the shopping session of the client device user at the online store has ended with one or more unpurchased items in an online shopping cart;

determining, by the at least one computing device, a portion of the online store content corresponding to an unpurchased item that the client device user focused on during the shopping session based on the locations of the tracked gaze described by the tracking data, the focused-on portion determined by processing the tracking data to determine at least one of an amount of time the client device user gazed at the online store content at the locations or a number of times the client device user gazed at the online store content at the locations;

configuring, by the at least one computing device, a personalized marketing communication for the client device user by inserting into the personalized marketing communication the focused-on portion of online store content corresponding to the unpurchased item; and transmitting, by the at least one computing device, digital content configured as a personalized marketing communication over a network connection after the shopping session has ended for display by a client device associated with the client device user.

2. A method as described in claim 1, wherein the portion of the online store content on which the client device user focused is determined responsive to the determination that the shopping session of the client device user at the online store has ended with the one or more unpurchased items in the online shopping cart.

3. A method as described in claim 1, wherein the portion of the online store content that the client device user focused on is determined based on an amount of time the client device user interacted with the portion of the online store content according to the tracked gaze.

4. A method as described in claim 1, wherein
the personalized marketing communication is further configured by inserting one or more additional portions of the online store content that the client device user did not focus on during the shopping session based on determinations that the client device user did not gaze at the additional portions in the user interface and that the additional portions relate to the focused-on portion.

5. A method as described in claim 1, further comprising analyzing the tracked gaze to determine characteristics of the unpurchased item that are of interest to the client device user, the personalized marketing communication being further configured by inserting additional digital content indicative of the determined characteristics of interest.

6. A method as described in claim 1, further comprising determining substitute items for the unpurchased item, the personalized marketing communication being further configured by inserting additional digital content indicative of information about one or more of the substitute items.

7. A method as described in claim 6, wherein the tracked gaze is analyzed to determine characteristics of the unpurchased item that are of interest to the client device user, and the information about the one or more substitute items comprises information about characteristics of the one or more substitute items that are comparable to the characteristics of interest of the unpurchased item.

8. A method as described in claim 1, wherein the focused-on portion of online store content inserted into the personalized marketing communication is a portion of a digital image the client device user focused on during the shopping session.

9. A method as described in claim 8, further comprising:
performing an optical character recognition (OCR) technique on text included in the portion of the digital image; and
using a natural language processing (NLP) technique to relate recognized text to characteristics of the unpurchased item, the personalized marketing communication being further configured by inserting additional digital content indicative of information about the characteristics related to the recognized text.

10. A method as described in claim 1, wherein the focused-on portion of online store content inserted into the personalized marketing communication is a portion of text that the client device user focused on during the shopping session.

11. A method as described in claim 1, wherein the focused-on portion of online store content inserted into the personalized marketing communication is a digital image configured for user selection from the digital content configured as the personalized marketing communication to launch a video associated with the unpurchased item, the digital image chosen from a video viewed by the client device user during the shopping session, and the digital image corresponding to a portion of the viewed video with which the client device user interacted.

12. A method as described in claim 1, wherein the online store comprises a website accessible via a browser user interface such that the gaze of the client device user is tracked in relation to the online store content presented via the browser user interface.

13. In a digital environment in which client device users select items such as products or services for potential purchase via an online store, a system to personalize marketing content for the client device users, the system comprising:
   a display device configured to display a user interface of the online store that a client device user interacts with to conduct an online shopping session;
   an eye tracker configured to track locations on the user interface where a gaze of the client device user is focused during the shopping session; and
   a processing system to implement an interaction-based content configuration module, the interaction-based content configuration module configured to:
      receive eye tracking data from the eye tracker describing portions of online store content displayed via the user interface that correspond to the tracked locations on the user interface where the gaze of the client device user is focused during the online shopping session;
      responsive to a determination the online shopping session of the client device user with the online store ends, determine the portions of the online store content that correspond to an unpurchased item on which the client device user's gaze focused during the online shopping session based on the tracked locations of the client device user's gaze described by the received eye tracking data, a focused-on portion of the online store content determined by processing the eye tracking data to determine at least one of an amount of time the client device user gazed at the online store content at the tracked locations or a number of times the client device user gazed at the online store content at the tracked locations;
      determine a configuration of a personalized marketing communication for the client device user, at least one section of the configuration determined to include the focused-on portion of the online store content corresponding to the unpurchased item;
      generate digital content corresponding to the personalized marketing communication; and
      display the digital content corresponding to the personalized marketing communication after the online shopping session has ended and via the display device.

14. A system as described in claim 13, wherein the interaction-based content configuration module is further configured to determine additional portions of online store content the client device user focused on based on user-selection inputs received via the user interface.

15. A system as described in claim 13, wherein the interaction-based content configuration module is further configured to determine characteristics of the unpurchased item that relate to the portions of online store content the customer focused on during the online shopping session.

16. A system as described in claim 15, wherein the interaction-based content configuration module is further configured to determine at least one substitute item comparable to the unpurchased item based on the determined characteristics.

17. A system as described in claim 16, wherein the interaction-based content configuration module is further configured to generate the personalized marketing communication to include additional digital content indicative of information that compares the unpurchased item to the at least one of the substitute item.

18. In a digital environment in which client device users select items such as products or services for potential purchase via an online store and an online shopping cart is used to maintain the user-selected items, a method to personalize marketing content related to sale of the items maintained in the online shopping cart by at least one computing device, the method comprising:
   determining, by the at least one computing device, that a shopping session of a client device user at the online store has ended with an unpurchased item in the online shopping cart;
   determining, by the at least one computing device, characteristics of the unpurchased item on which the online store customer focused by analyzing online store browsing data that describes where a gaze of the client device user is focused in relation to online store content displayed via a computer-application user interface, the characteristics determined by processing the online store browsing data to determine at least one of an amount of time the online store customer's gaze focused on at least one of text or images of the online store content indicative of the characteristics or a number of times the online store customer's gaze focused on the images or text indicative of the characteristics;
   configuring, by the at least one computing device, a personalized marketing communication for the online store customer by inserting into the personalized marketing communication the images or text indicative of the characteristics;
   generating, by the at least one computing device, digital content corresponding to the personalized marketing communication for the client device user; and
   transmitting, by the at least one computing device, the digital content corresponding to the personalized marketing communication over a network connection to a client device associated with the client device user.

19. A method as described in claim 18, wherein the digital content is an email, and the method further comprises generating a subject for the email that includes information associated with the characteristics.

20. A method as described in claim 18, further comprising configuring the personalized marketing communication by inserting one or more additional portions of the online store content that the online store customer's gaze did not focus on during the shopping session.

* * * * *